US007020641B2

(12) United States Patent
Leong et al.

(10) Patent No.: US 7,020,641 B2
(45) Date of Patent: Mar. 28, 2006

(54) METHOD, SYSTEM, AND PROGRAM FOR MAINTAINING A DATABASE OF DATA OBJECTS

(75) Inventors: Terence Leong, Benicia, CA (US); Mahima Mallikarjuna, Los Gatos, CA (US); Julian S. Taylor, Nederland, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 645 days.

(21) Appl. No.: 10/038,892

(22) Filed: Oct. 22, 2001

(65) Prior Publication Data

US 2003/0078902 A1 Apr. 24, 2003

(51) Int. Cl.
*G06F 15/18* (2006.01)

(52) U.S. Cl. ............................ 706/12; 706/14; 706/46

(58) Field of Classification Search ................. 706/12, 706/14, 46; 715/523
See application file for complete search history.

(56) References Cited

U.S. PATENT DOCUMENTS

| | | | | |
|---|---|---|---|---|
| 6,009,436 | A * | 12/1999 | Motoyama et al. | 707/102 |
| 6,085,196 | A * | 7/2000 | Motoyama et al. | 707/102 |
| 6,128,771 | A | 10/2000 | Tock et al. | |
| 6,678,867 | B1 * | 1/2004 | Fong et al. | 715/523 |
| 2002/0085032 | A1 * | 7/2002 | Fong et al. | 345/760 |
| 2002/0089538 | A1 * | 7/2002 | Wenzel et al. | 345/763 |
| 2003/0046673 | A1 * | 3/2003 | Copeland et al. | 717/163 |

OTHER PUBLICATIONS

Bancilhon, Francois. "Object-Oriented Database Systems", 1988, ACM 0-89791-63-2/88/0003/0152, France, pp. 152-162.

Baroody, Jr., A. James et al. "An Object-Oriented Approach to Database System Implementation", Dec. 1981, ACM Transactions on Database Systems, vol. 6, No. 4, pp. 576-601.

Bierman, GM. "Using XML as an Object Interchange Format", May 17, 2000, Univ. of Warwick, pp. 1-13.

Boll, Susanne, et al. "A Java Application Programming Interface to a Multimedia Enhanced Objected-Oriented DBMS" German National Research Center for Information Technology, Germany, pp. 1-11. [Retrieved on Nov. 17, 2000].

Kim, Won. "Research Directions in Object-Oriented Database Systems", 1990, ACM 089791-352-3/90/0004/0001, Austin, Texas, pp. 1-15.

(Continued)

*Primary Examiner*—Joseph P. Hirl
(74) *Attorney, Agent, or Firm*—Lahive & Cockfield, LLP

(57) ABSTRACT

Provided is a method, system, and program for maintaining a database of data objects. A first data object implemented in a first programming language including attributes and attribute values for a class is received. The first data object is transformed to a second data object implemented in a second programming language, wherein the second data object includes the attributes and attribute values of the class included in the first data object. The second data object is added to the database, wherein the database is capable of storing multiple data objects implemented in the second programming language.

60 Claims, 8 Drawing Sheets

OTHER PUBLICATIONS

Li, Qing et al. "Object Flavor Evolution in an Object-Oriented Database System", 1988, ACM 0-89791-261-6/88/0003/0265, Los Angeles, California, pp. 265-275.

Pantziarka, Panagiotis. "Objected Oriented Database Using Frames in Second Generation APL", 1990, ACM 089791-371-X/90/0008/0284, London, pp. 284-287.

Smith, Karen E. et al. "Intermedia: A Case Study of the Differences Between Relational and Object-Oriented Database Systems", Oct. 4-8, 1987, ACM 0-89791-247-0/87/0010-0452, Providence, Rhode Island, pp. 452-465.

Stevens, Al. "Object-Oriented Database Management Systems, Examining a trio of OODBMS tools" [online], 1993, *Dr. Dobb's Journal*, pp. 1-22. [Retrieved on Nov. 16, 2000] Retrieved from the Internet.

U.S. Appl. No. 09/722,923, filed on Nov. 27, 2000, entitled, "Method, System, Program, and Computer Readable Medium for Providing a Database for Object Oriented Objects", Invented by T. Leong, M. Mallikarjuna, and B.E. Talc.

* cited by examiner

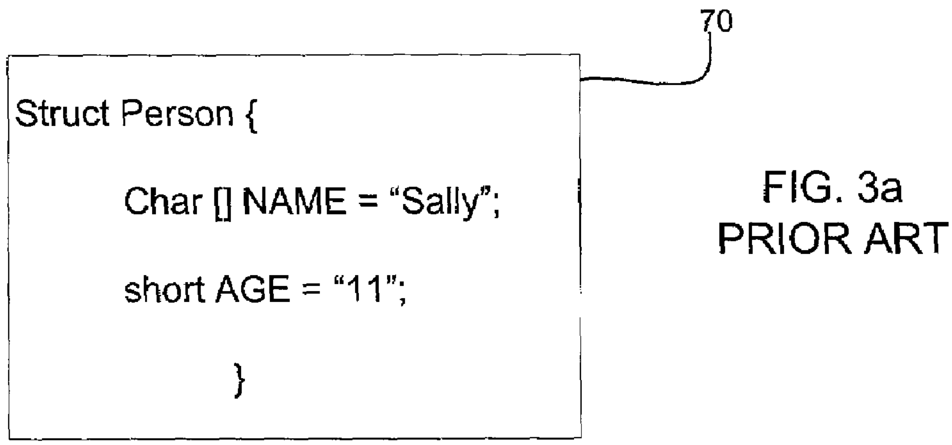
FIG. 3a
PRIOR ART
FIG. 3b
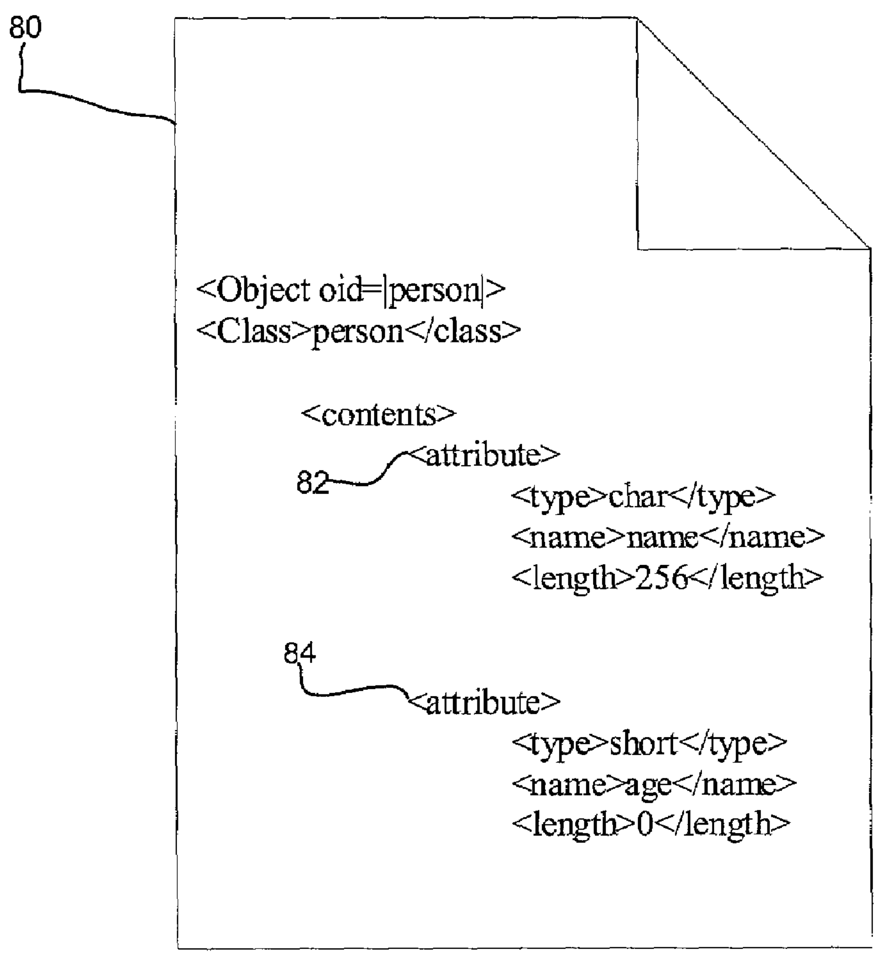

METHOD, SYSTEM, AND PROGRAM FOR MAINTAINING A DATABASE OF DATA OBJECTS

BACKGROUND OF THE INVENTION

1. Field of the Invention

The present invention relates to a method, system, and program for maintaining a database of data objects.

2. Description of the Related Art

An object oriented data base system (OODBMS) provides a persistent and sharable repository and manager of objects defined according to an object-oriented data model. Every object encapsulates a state and behavior. The state of an object comprises the values of the attributes (also referred to as properties) defined for the object, and the behavior of the object comprises the methods provided with the objects. Objects that share the same attributes and methods comprise a class. All the objects maintained in an OODBMS are members of the same class or have the same parent class. This means that the same set of methods defined for the class are used to manipulate the objects in the OODBMS, such as create, delete, add, read, modify, update, etc. Further, the objects in a class have the same attributes defined for the class, even though particular attributes within any of the objects in the class may have different values. Objects persistently stored within an OODBMS defined for a class are viewed and distinguished according to the values provided for their attributes. Each object is further provided a unique identifier for use in accessing the object within the OODBMS using the interfaces provided for the class. Benefits and further explanations of object oriented databases are described in "Research Directions in Objected-Oriented Database Systems", by Won Kim (Copyright Association of Computing Machinery, 1990); "Intermedia: A Case Study of the Differences Between Relational and Object-Oriented Database Systems", by Karen E. Smith, Stanley B. Zdonik, OOPSLA '87 Proceedings (Copyright Association of Computing Machinery, 1987); and U.S. Pat. No. 6,128,771, all of which publications and patents are incorporated herein by reference in their entirety.

Currently, many object oriented database systems are implemented using a Java application programming interface (API).** The application programmer may write APIs in Java to use to access the object oriented database management system (OODBMS). The interfaces to the objects in the OODBMS are also written in Java, and the objects in the OODBMS are implemented as Java classes. In such Java implemented OODBMS, Java applications can generate Java objects to add to the Java OODBMS and utilize Java APIs to manipulate the Java objects in the Java OODBMS.

One challenge with prior art object oriented database systems is that applications written in different programming languages cannot share objects in the same OODBMS. For instance, a C or C++ application program creating a C or C++ data object cannot add objects to a Java OODBMs because of differences in the naming conventions and structures in the different programming languages. Thus, although two applications written in different languages may utilize the same class of objects having the same attributes and attribute values, and desire to share the same data objects, the applications in the different programming languages cannot store and access objects in the same OODBMS. Due to such limitations, duplicate object oriented databases must be provided for the application programs in the different programming languages even though such application programs intend to use the same data objects instantiated from the same class. Further, one application will not be able to access or manipulate the objects created by the other application and maintained in that applications OODBMS.

For these reasons, there is a need in the art to provide mechanisms to allow application programs in different programming languages to utilize the same OODBMS.

SUMMARY OF THE DESCRIBED IMPLEMENTATIONS

Provided is a method, system, and program for maintaining a database of data objects. A first data object implemented in a first programming language including attributes and attribute values for a class is received. The first data object is transformed to a second data object implemented in a second programming language, wherein the second data object includes the attributes and attribute values of the class included in the first data object. The second data object is added to the database, wherein the database is capable of storing multiple data objects implemented in the second programming language.

Further, a class schema is received including information on the class and attributes of the first data object and used to transform the first data object to the second data object.

In still further implementations, using the received class schema to transform the first data object to the second data object comprises generating a source code file in the second programming language to implement the class and attributes in the class schema. The source code file is compiled to generate an executable file that implements methods of the class. One method of the class is used to construct the second data object and the attribute values from the first data object are included in the second data object.

Further provided is a method, system, and program for returning data objects from a database to an application that processes data objects in a first programming language. A request is received from the application for at least one data object in the database having attributes and attribute values of a class. Each requested data object is accessed from the database, wherein data objects in the database are implemented in a second programming language. Each accessed data object is transformed to one transformed data object implemented in the first programming language, wherein each transformed data object includes the attributes and attribute values of the class in each accessed data object. Each transformed data object in the first programming language is returned to the application that initiated the request.

In further implementations, at least one class schema is provided, wherein each class schema includes information on one class and attributes of the class of at least one data object in the database. Transforming accessed data object to one transformed data object further comprises, for each accessed data object, using information on the attributes in the class schema for the class of the accessed data object to transform the accessed data object to the transformed data object.

Still further provided is a method, system, and program for providing information on a class. A definition of a class and attributes in the class are received. A file is generated and information on the class and each attribute in the received class definition is added to the generated file.

BRIEF DESCRIPTION OF THE DRAWINGS

Referring now to the drawings in which like reference numbers represent corresponding parts throughout:

FIG. 3*a* illustrates an example of a C data structure known in the prior art;

FIG. 3*b* illustrates an example of a class schema in accordance with implementations of the invention;

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
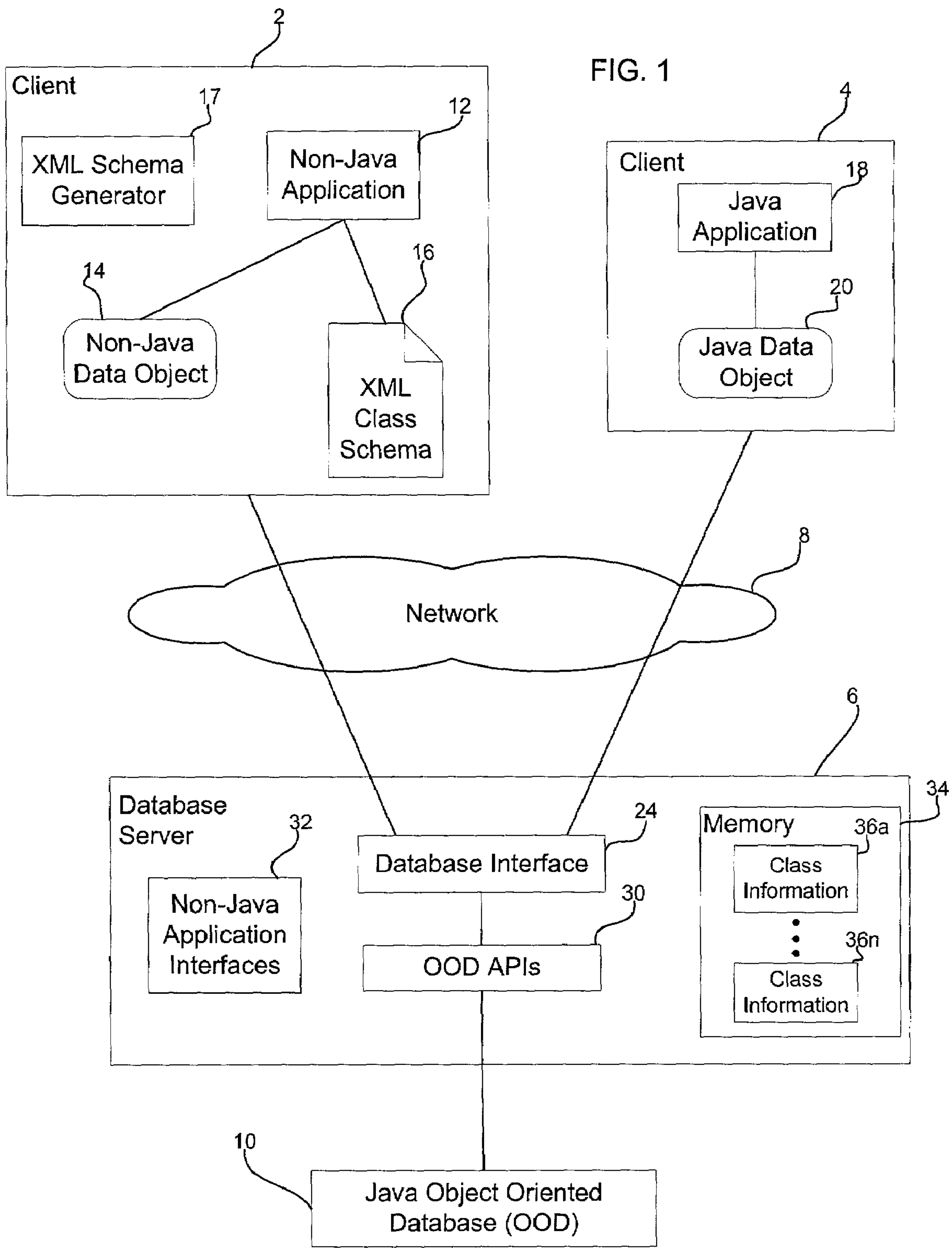
FIG. 1 illustrates a computing environment in which aspects of the invention are implemented.

FIG. 1 illustrates a computing environment in which aspects of the invention are implemented. Two client systems 2 and 4 communicate with a database server 6 over a network 8 using a communication protocol, such as the Transfer Control Protocol/Internet Protocol (TCP/IP), or other communication protocol known in the art. The database server 6 manages access to an object oriented database (OOD) 10. The OOD 10 is maintained in a storage system accessible through the database server 6. In described implementations, the OOD 10 is implemented in an object oriented programming language, such as Java. All objects in the object oriented database (OOD) 10 are members of a same database parent class. The client systems 2 and 4 and database server 6 may comprise any microprocessor computing system capable of providing a platform to execute the programs and instructions described herein, such as a personal computer, laptop computer, server, mainframe, workstation, hand held computer, telephony device, etc. The network 8 may comprise any network known in the art, such as a local area network (LAN), Intranet, the Internet, Wide Area Network (WAN), etc., or a wireless connection.

Client system 2 includes a non-Java application program 12, which for purposes of description, is implemented in a structured or object oriented programming language other than Java, e.g., C, C++, Smalltalk, Fortran, etc. The non-Java application program 12 is capable of producing non-Java data objects 14 that conform to a particular class structure implemented in the non-Java programming language of the application 12, and are non-Java objects. In the described implementations, the application program 12 provides an XML class schema 16 of the class structure, including the name, type, and length of each attribute of the class from which the non-Java data object 14 was instantiated. When presenting non-Java data objects 14 instantiated from different classes to the database server 6 for storage in the OOD 10, the application program 12 would present a different XML class schema 16 for each class of data objects. Thus, in described implementations, the non-Java application program 12 is capable of providing one XML class schema 16 for each type of class that will be used to instantiate non-Java data objects 14 that are to be stored in the OOD 10. In certain implementations, the client 2 further includes an XML schema generator program 17 or routine that is capable of generating the XML class schema 16 from a class source file in the non-Java application programming language.

The client system 4 includes an executing Java application 18 that is capable of producing Java data objects 20 in manner known in the art. The Java data objects 20 may be stored directly within the OOD 10 without any transformation because in the described implementations the OOD 10 is implemented as a Java OOD. The client system 4 would further include a Java Virtual Machine (JVM) to convert Java bytecodes to instructions in the native machine language of the client 4. The client systems 2 and 4 are capable of transmitting a data stream to the database server 6 over the network 8, which in the case of client system 2 includes the non-Java data object 14 and XML class schema 16 and in the case of the client system 4 includes a Java data object 20.

The database server 6 includes a database interface 24 that monitors a port on the database server 6 for requests from clients 2 and 4 to access the object oriented database 10. The database interface 24 includes logic described below to use the XML class schema 16 to transform a non-Java data object 14 to a Java object for storage in the OOD 10. The database interface 24 accesses non-Java application interfaces 32 to manipulate data within non-Java data objects produced by the non-Java application 12. If the database interface 24 is capable of handling data objects in multiple non-Java application programming languages, then non-Java application interfaces and a language translator therefor would be provided for each supported non-Java language. The database interface 24 would utilize Java object oriented database application interfaces (OOD APIs) 30 to manipulate the data in the Java OOD 10. The OOD APIs 30 would comprise instructions to parse and perform operations within the OOD 10, such as instructions to add data, delete data, access and read data, update data, etc., in an object oriented database in a manner known in the art. The database interface 24 invokes the OOD APIs 30 to perform the client requested manipulation of the OOD 10. In implementations where the OOD APIs 30 comprise Java commands or the database interface 30 is implemented as a Java program, then the database server 6 would include a Java Virtual Machine (JVM) to convert Java bytecodes to instructions in the native machine language of the database server 6.

The database server 6 further includes a volatile memory 34 used for general operations. The memory 34 stores information on non-Java classes accessed from the XML class schema 16. In this way, the database interface 24 maintains in memory 34 class information 36*a* . . . *n*, including information on the class name and class attributes, including the name, data type, and data length of the attributes for the class.

Figure 2:
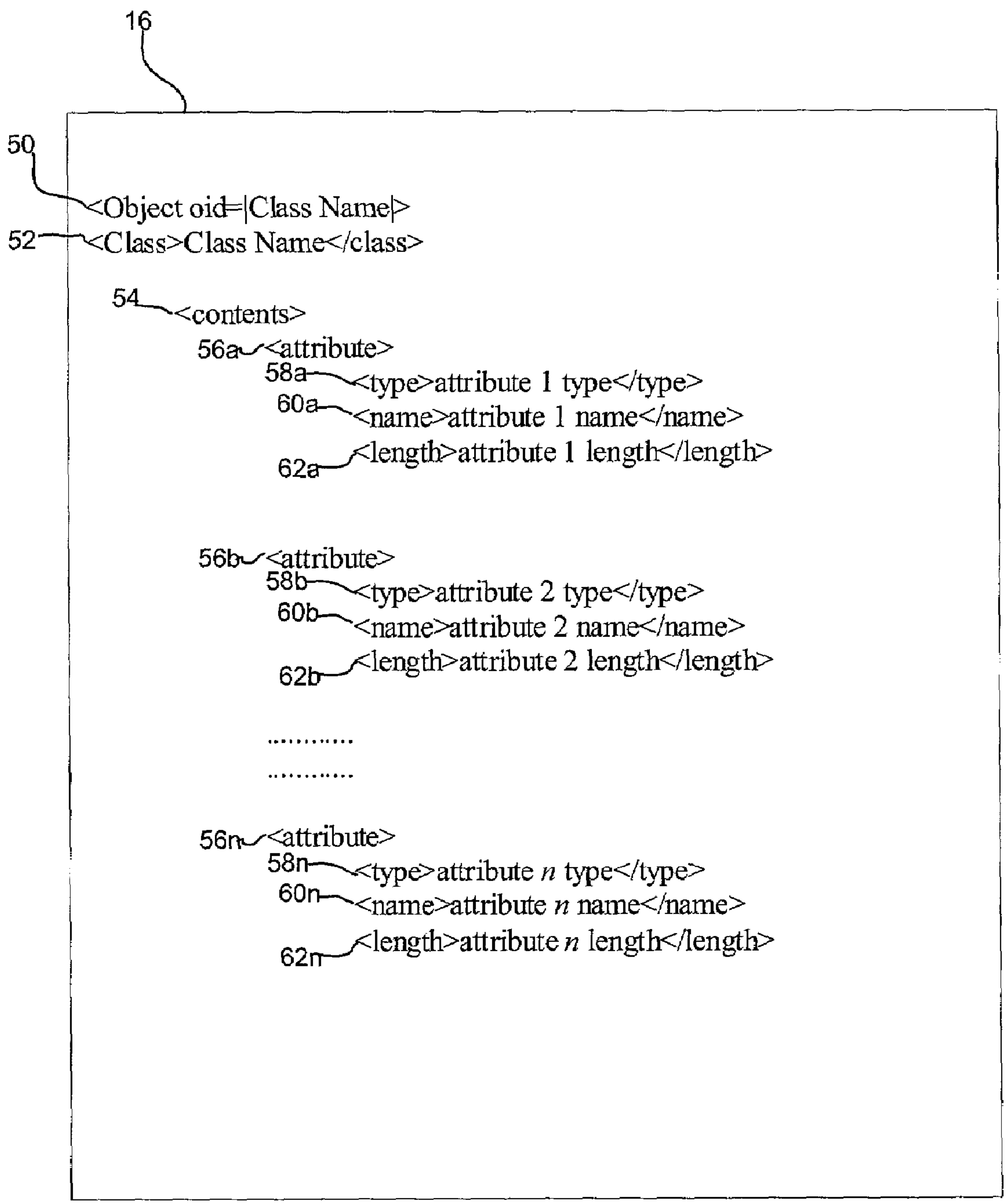
FIG. 2 illustrates a file maintaining information on a class schema in accordance with implementations of the invention.

FIG. 2 illustrates a format of the XML class schema 16 file in accordance with implementations of the invention. The XML class schema file 16 includes general class information, such as a class name of the object identifier 50 and the name of the class 52. Following the general class information is a <contents> tagged element 54 that has one or more attribute tagged subelements 56*a, b . . . n*. Each attribute subelement 56*a, b . . . n* provides information on each attribute of the class defined by the XML class schema file 16. Each attribute subelement 56*a, b . . . n* further has tagged attributes of the attribute data type 58*a, b . . . n*, attribute name 60*a, b . . . n*, and attribute data length 62*a, b . . . n*. In this way, the XML class schema file 16 provides information on the structure of a non-Java class.

FIG. 3*a* illustrates a data structure in the C programming language named PERSON 70 that is defined with the attributes NAME having an attribute value of "Sally" and AGE having an attribute value of "11". The NAME attribute is a character data type and the AGE attribute is a short data type. FIG. 3*b* illustrates how the C structure "Person" would be expressed in an XML schema file 80, defining the class name and information on the NAME 82 and AGE 84 attributes of the person class, and the type, name and length of each attribute.

Figure 4:
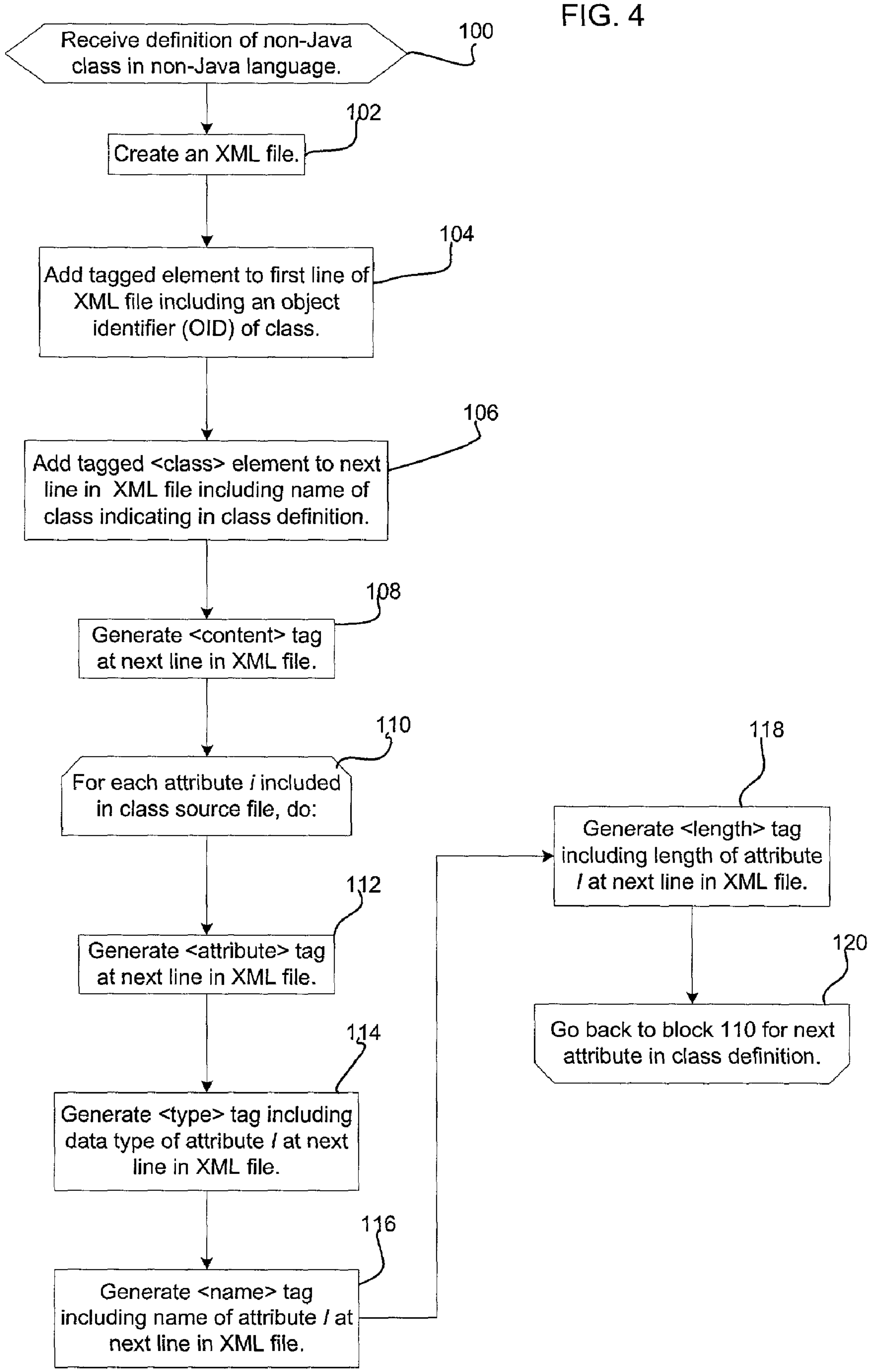
FIG. 4 illustrates logic to generate a class schema in accordance with implementations of the invention.

FIG. 4 illustrates logic implemented in the XML schema generator 17 to generate an XML class schema 16 for a non-Java class. Control begins at block 100 upon receiving a definition of a non-Java class in a source code file in the non-Java programming language. In response, an XML file 16 is created (at block 102). A tagged element 50 (FIG. 2) is added (at block 104) to the first line of the XML file including an object identifier (OID) of the class. A <class> tag element 52 is added (at block 106) to the next line in the XML file 16 including the name of the class as indicated in the class source code file and a content tag 54 is added (at block 108) on the next line. From blocks 110 through 120 a loop is performed for each attribute i included in the class source file. An attribute tag 56*a, b . . . n* is then generated (at block 112) into the XML schema file 16 on the next line. For the attribute i, a <type> tag 58*a, b . . . n* is generated (at block 114) on the next line of the XML file 16 including the data type of attribute i, a <name> tag 60*a, b . . . n* is generated (at block 116) on the next line including the name of the attribute i, and a <length> tag is generated (at block 118) on the next line having the length of the attribute i. Control then proceeds (at block 120) back to block 110 to process information on the next attribute in the non-Java class source code file until all the attributes defined in the source code file are processed.

In alternative implementations, XML class schemas 16 may be created in alternative fashions, such as through manual editing or a series of prompts that requests information on the class and attributes thereof from a user, and from such information generates the XML class schema 16.

Figure 5:
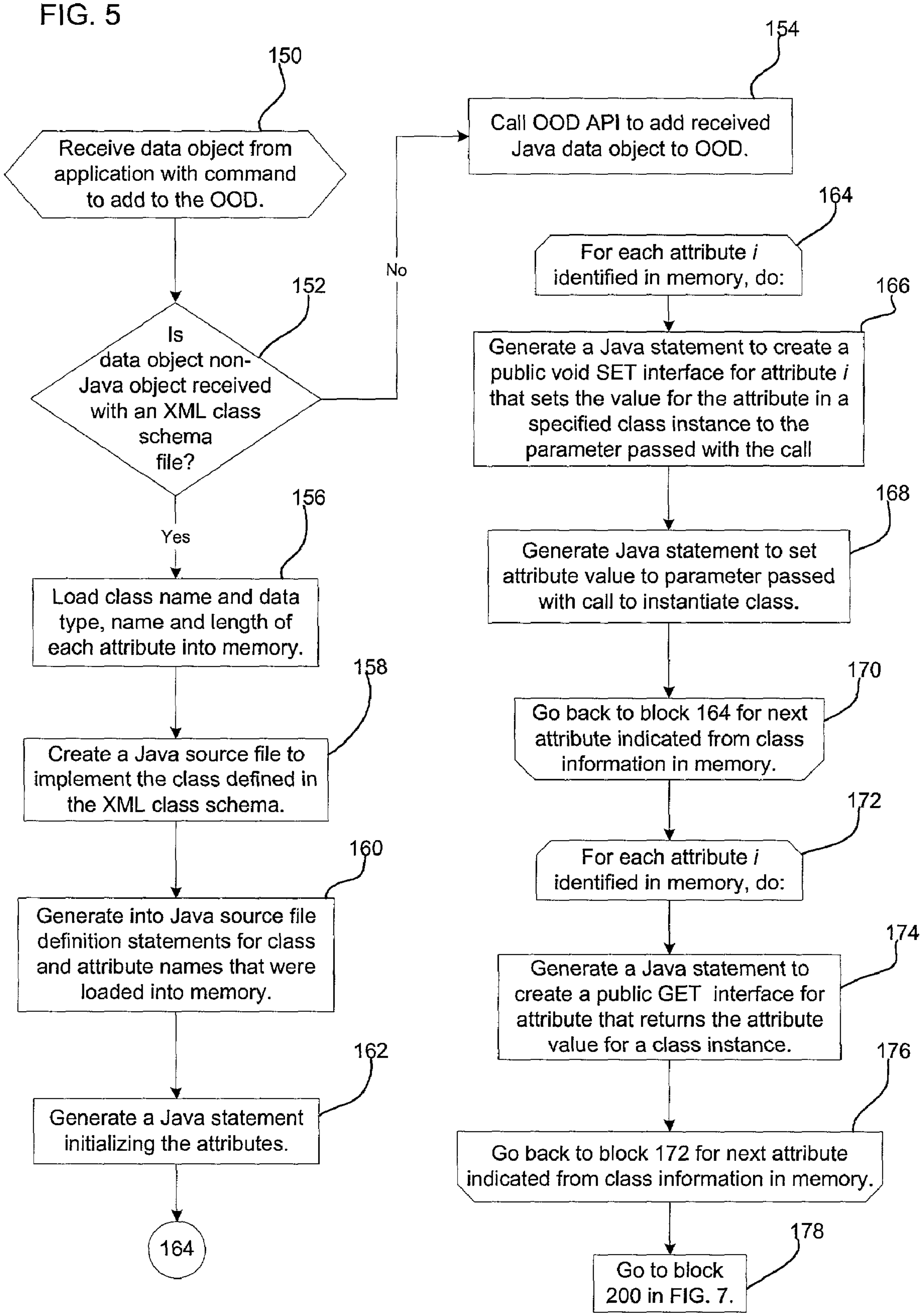
FIGS. 5 and 7 illustrates logic to add data objects to a database in accordance with implementations of the invention.
Figure 6:
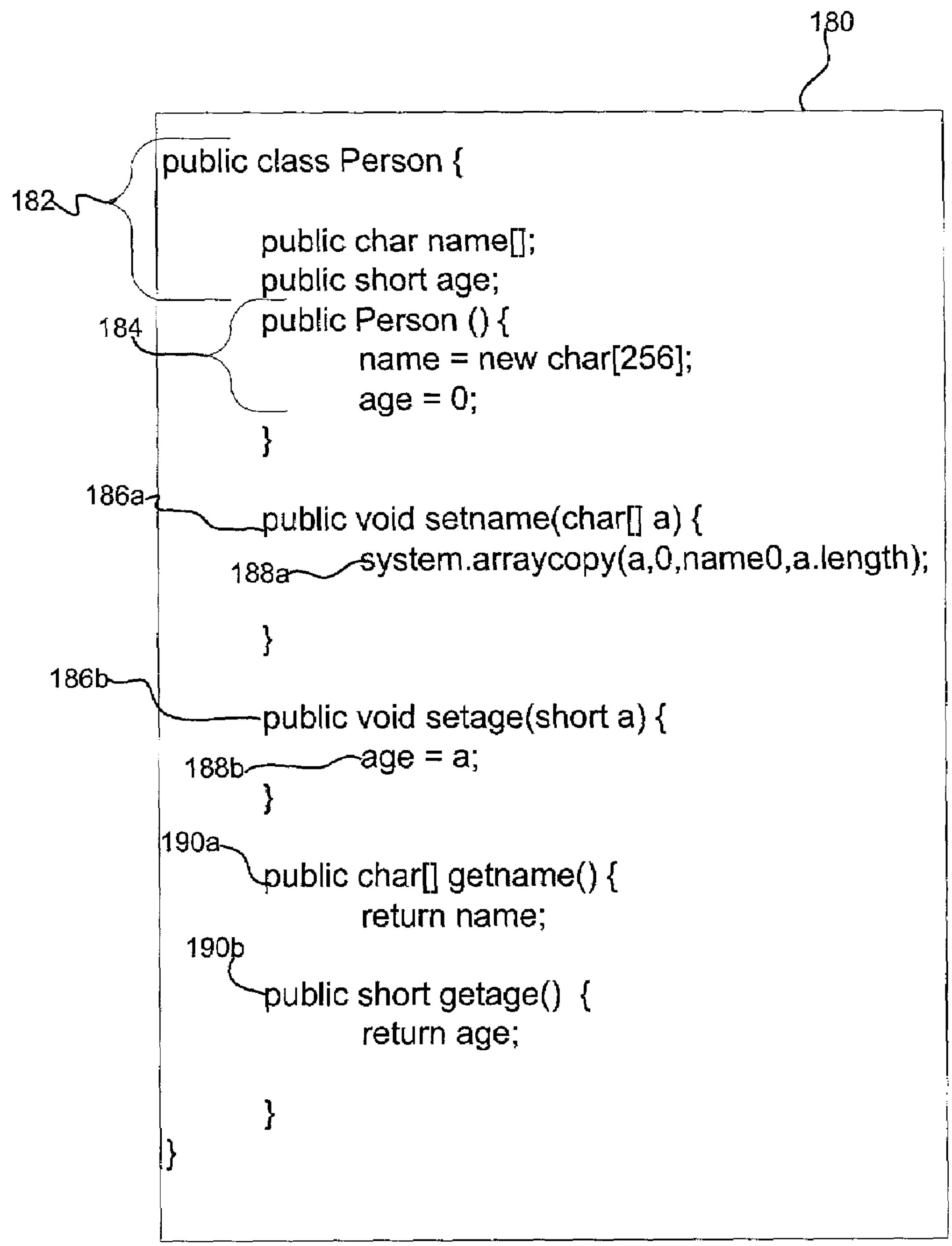
FIG. 6 illustrates a source file generated with the logic of FIG. 5 in accordance with implementations of the invention.
Figure 7:
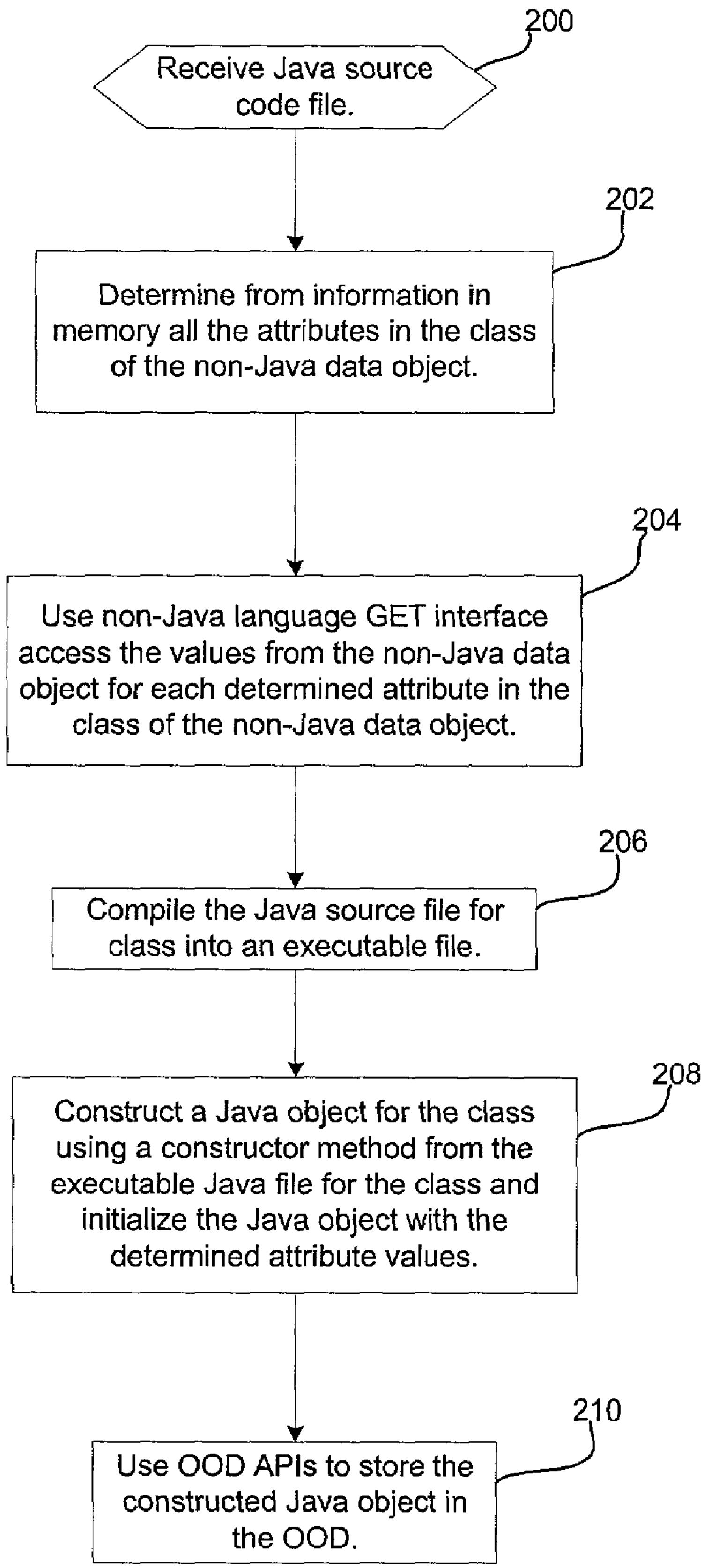

FIGS. 5 and 7 illustrate logic implemented in the database interface 24 to handle a request from a non-Java or Java application 12, 18 to add a non-Java 14 or Java 20 data object to the object oriented database (OOD) 10. If (at block 152) the received data object 14, 20 is a Java language object, then the database interface 24 calls (at block 154) an OOD API 30 to add the Java data object 20 directly to the object oriented database 10. Otherwise, if (at block 152) the received data object is a non-Java data object 14 received with an XML schema file 16, then the class name and attribute name, data type, and length information included in the XML schema file 16 (FIGS. 1, 2) are loaded (at block 156) into memory 34 as one class information 36*a . . . n* set. The database interface 24 creates (at block 158) a Java source file to code the class defined the XML class schema 18. FIG. 6 illustrates an example of a Java class source file 180 that the database interface 24 would generate from the XML schema file 16 with the logic of FIG. 5. The definition statements 182 (FIG. 6) for the class and attributes are generated (at block 160) into the Java source file 180. The statements to initialize 184 the attributes are then generated (at block 162) on the next lines of the source file 180.

For each attribute i indicated in the class information 36*a . . . n* in the memory 34 (FIG. 1), a loop is performed at blocks 164 through 170. At block 166, the database interface 24 generates a Java statement to create a public void SET interface 186*a, b* (FIG. 6) for the attribute that sets the value for the attribute in the data object instantiated for the class from the compiled executable version of the Java source file 16. A Java statement 188*a, b* is then generated (at block 168) to set the attribute value to the parameter passed with the constructor method to create a Java object for the class. Control then proceeds (at block 170) back to block 164 for the next attribute indicated in the class information 36*a . . . n* in memory 34.

After generating the SET statements, a loop is performed at blocks 172 through 176 for each attribute indicated in the class information 36*a . . . n* to generate (at block 174) a public GET interface 190*a, b* for attribute i that returns the attribute value in the data object instantiated for the class of the Java source file 180 being created. Control then proceeds to block 200 in FIG. 7.

With respect to FIG. 7, a determination is made (at block 202) from the class information set 36*a, b . . . n* for the class of the non-Java data object to add to the database of all the attributes in the class. The database interface 24 then uses the non-Java application interfaces, such as a non-Java GET interface, to access (at block 204) the attribute values from the non-Java data object 14 for each determined attribute in the class of the non-Java data object 14. The Java source code file 180 (FIG. 6) is then compiled (at block 208) into an executable file. The database interface 24 then constructs (at block 208) a Java object for the class using a constructor method from the executable version of the Java source file for the class, wherein the constructor method initializes the Java object with the determined attribute values, which may be passed to the constructor method as parameters. The database interface 24 then uses (at block 210) the OOD APIs 30 to store the constructed Java object in the Java OOD 10.

In the described implementations, the database interface 24 generates and compiles the Java source file as part of translating a non-Java data object 14 to a Java data object. In alternative implementations, the database interface 24 may use a constructor defined in a previously compiled Java source file for the class of the data object to generate a Java data object with the attribute values accessed from the non-Java data object 14 using the non-Java application interfaces 32, thereby avoiding the need to reconstruct and recompile the Java source file 180.

Figure 8:
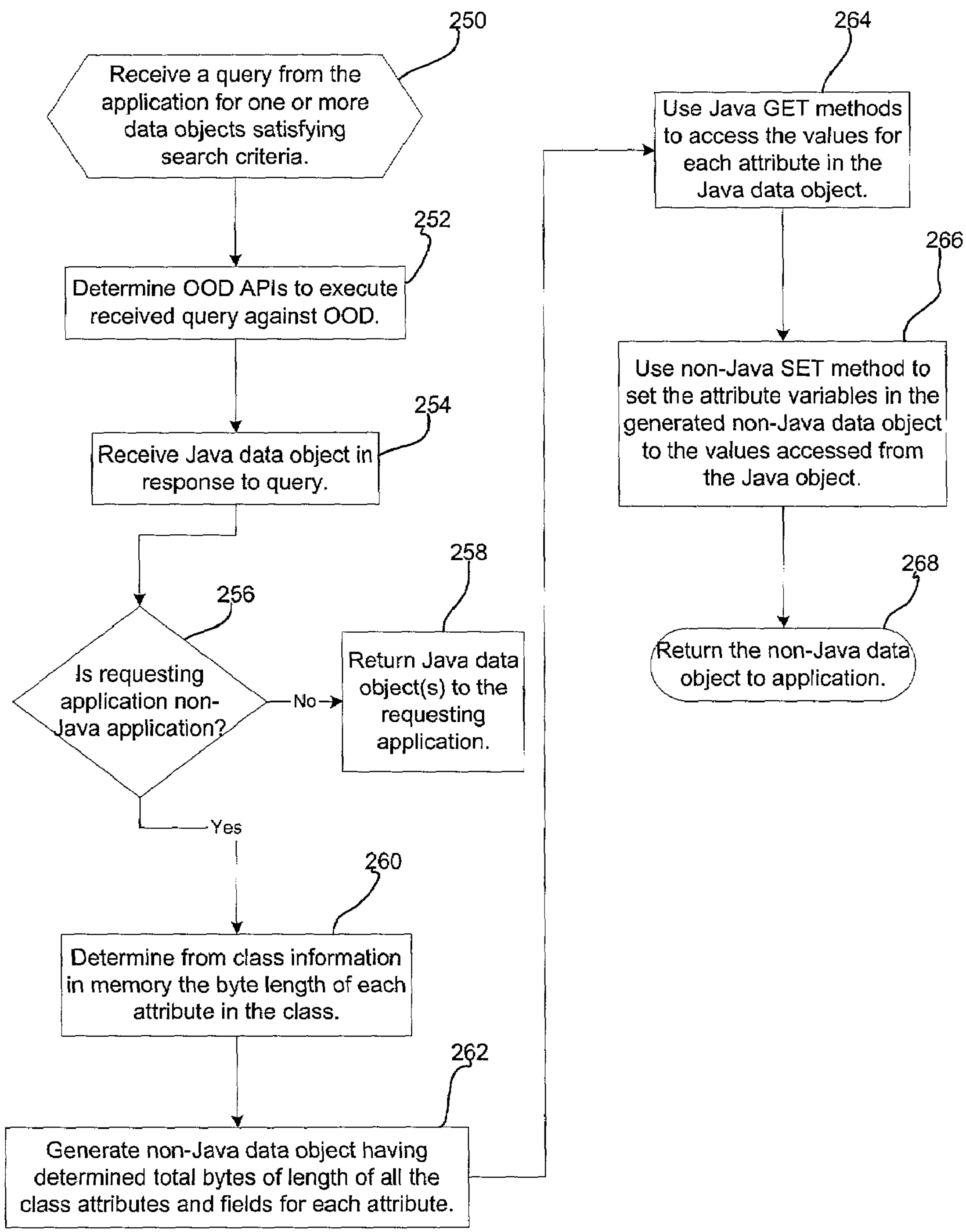
FIG. 8 illustrates logic to retrieve a data object from the database in accordance with implementations of the invention.

FIG. 8 illustrates logic implemented in the database interface 24 to process a query from the applications 12 and 18 for one or more data objects satisfying a search criteria. In response to the query, the database interface 24 would determine (at block 252) the OOD APIs 30 to implement the received query. Upon executing the determined APIs 30 and receiving (at block 254) the one or more Java data objects from the OOD database 10 in response to the query, the database interface 24 determines (at block 256) whether the requesting application is a non-Java application 12. If not, the received Java data objects are returned (at block 258) to the requesting Java application 18, without further transformation of the Java data object accessed from the OOD 10. Otherwise, if the application is the non-Java application 12, then the database interface 32 determines (at block 260) from the class information 36*a . . . n* in the memory 34 the data length of each attribute in the class and generates (at block 262) a non-Java data object having the determined total number of bytes of the length of all the class attributes. The database interface 24 then uses (at block 264) the Java GET methods to access each attribute value in the Java data object and then uses (at block 266) the non-Java SET methods, from the non-Java application interfaces 32, to set the attribute values in the generated non-Java data object to the values accessed from the Java object. The non-Java data object is then returned to the non-Java application 12.

Thus, with the described implementations, a database interface 24 component transforms non-Java data objects into Java data objects for storage in a Java OOD 10, so that a single Java OOD 10 can be used to store data objects from different application programs 12, 18 implemented in different application programming languages, e.g., Java, C, C++, Smalltalk, etc.

Additional Implementation Details

The above described method, apparatus or article of manufacture for maintaining data objects from different application programs in a object database may be implemented using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.)). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, one client application comprised a Java application and the other a non-Java application. However, the client applications may both be implemented in any non-Java object oriented programming language known in the art, or implemented in structured programming languages.

In the described implementations, objects from multiple classes may be maintained in the object oriented database.

In the described implementations, the class information accessed from the class schema was stored in memory for later access and to generate the non-Java object. In alternative implementations, the class information may be maintained in the XML schema file. In such case, the class information can be accessed directly from the XML schema file when the class information is needed to reconstruct the non-Java object.

In described implementations, the database interface 24 was maintained in a database server 6 through which clients 2 and 4 access the Java OOD 10. In alternative implementations, the database interface 24 may be located in an additional intermediary system or within the clients 2 and 4.

In described implementations, an XML document format was used to provide information on the class schema for non-Java classes. In alternative implementations, a different file format, such as a different structured file format, may be used to represent the class and class attributes of the object instance of the class, such as a different standard generalized markup language (SGML), hypertext mark-up language (HTML), extensible hypertext markup language (xHTML), etc. In this way, the attributes of a class may be defined in alternative structured document formats.

In described implementations, the database interface 24 maintains data objects as Java data objects in the OOD 30, such that non-Java data objects are transformed to Java data objects for storage in the OOD 30. In alternative implementations, the database interface 24 may maintain data objects in the OOD 10 in programming languages other than Java, such as C, C++, SmallTalk, etc. In such case, the database interface 24 would transform Java data objects to the non-Java language format used for the data objects in the OOD 10.

The database interface 24 may include non-Java application interfaces for multiple non-Java programming languages to allow the storage of data objects from application programs implemented in multiple different non-Java programming languages.

In discussed implementations, the client applications are included in client systems that communicate with the database server over a network. In alternative implementations, the applications and database interface may be implemented on the same computing platform including the database daemon.

In the described implementations, a constructor method is used to construct a Java data object with default values and then separate SET methods are called to set the attribute values in the Java data object with the attribute values accessed from the non-Java data object 14. In alternative implementations, the Java source file may be generated to include statements to set the attribute values to the attribute values accessed from the non-Java data object 14, such that during compilation of the Java source file, an instance of a Java object is generated having attribute values set to the attribute values from the non-Java data object 14.

The foregoing description of various implementation of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. In an electronic device, a method for maintaining a database of data objects, comprising:

receiving, by a database interface, a request to store in a database capable of storing data objects in a second programming language a first data object implemented in a first programming language including attributes and attribute values for a class, the database interface in communication with the database and capable of storing data objects implemented in the first programming language or the second programming language to the database;

transforming, by the database interface, the first data object to a second data object implemented in the second programming language, wherein the second data object includes the attributes and attribute values of the class included in the first data object; and storing, by the database interface in response to the request, the second data object to the database.

2. The method of claim 1, further comprising:

receiving, by the database interface, a class schema including information on the class and attributes of the first data object; and using, by the database interface, the received class schema to transform the first data object to the second data object.

3. The method of claim 2, wherein using the received class schema to transform the first data object to the second data object further comprises:

generating a source code file in the second programming language to implement the class and attributes included in the class schema;

compiling the source code file to generate an executable file that implements methods of the class;

using one method of the class to construct the second data object; and including the attribute values from the first data object into the second data object.

4. The method of claim 3, wherein generating the source code file in the second programming language further comprises:

generating statements into the source code file to define SET and GET interfaces for each attribute in the class.

5. The method of claim 4, wherein including the attribute values from the first data object into the second data object further comprises:

using at least one GET method in the first programming language to access the attribute values from the first data object; and using at least one SET method in the second programming language to set each attribute in the second data object to the corresponding accessed attribute value.

6. The method of claim 4, wherein including the attribute values from the first data object into the second data object further comprises:

using at least one GET method in the first programming language to access the attribute values from the first data object; and generating statements into the source code file to set the attributes in the second data object to the accessed attribute values from the first data object, wherein compiling the source code file produces the second data object with the attribute values set to the attribute values accessed from the first data object.

7. The method of claim 2, wherein the class schema includes for each attribute a name, data type and length of the attribute.

8. The method of claim 2, wherein the class schema is implemented in an Extensible Markup Language (XML) file.

9. The method of claim 1, wherein the database comprises an object oriented database.

10. The method of claim 1, wherein the first programming language comprises a non-Java object oriented language and wherein the second programming language comprises the Java programming language.

11. The method of claim 1, further comprising:

receiving, by the database interface, a third data object implemented in the second programming language; and adding, by the database interface, the third data objet to the database.

12. The method of claim 1, further comprising:

receiving, by the database interface, a request to store in the database a third data object implemented in a third programming language including attributes and attribute values for one class;

transforming, by the database interface, the third data object to a fourth data object implemented in the second programming language, wherein the fourth data object includes the attributes and attribute values of the class included in the third data object; and storing, by the database interface in response to the request, the fourth data object to the database.

13. In an electronic device, a method for returning data objects from a database to an application that processes data objects in a first programming language, comprising:

receiving, by a database interface, a request from the application for a data object in the database storing the data object in a second programming language, the data object having attributes and attribute values of a class, the database interface in communication with the database and capable of returning from the database data objects implemented in a first programming language or the second programming language;

accessing, by the database interface, the requested data object from the database;

transforming, by the database interface, the accessed data object to a transformed data object implemented in the first programming language, wherein the transformed data object includes the attributes and attribute values of the class of the accessed data object; and returning, by the database interface in response to the request, the transformed data object to the application.

14. The method of claim 13, wherein transforming the accessed data object to the transformed data object further comprises for the requested data object:

using a GET interface in the second programming language to access the attribute values in the accessed data object; and using a SET interface in the first programming language to add each accessed attribute value from the accessed data object to the transformed data object.

15. The method of claim 13, wherein the application that processes data objects in the first programming language comprises a first application, further comprising:

receiving, by the database interface, a request for at least one data object in the database from a second application that processes data objects in the second programming language;

accessing, by the database interface, each requested data object from the database; and returning, by the database interface, each data object accessed from the database in response to the request from the second application to the second application.

16. The method of claim 13, further comprising:

providing a class schema, wherein the class schema includes information on one class and attributes of the class of the data object in the database, wherein transforming the accessed data object to the transformed data object further comprises, for the accessed data object, using information on the attributes in the class schema for the class of the accessed data object to transform the accessed data object to the transformed data object.

17. The method of claim 16, wherein the class schema includes a length of each attribute in the class, and wherein using the information on the attributes in the class schema to transform the accessed data object to the transformed data object further comprises:

accessing information on the length for each attribute in the class schema to generate the transformed data object with a size at least equal to a sum of lengths of all of the attributes in the class.

18. The method of claim 13, wherein the application requesting the data object is capable of processing data objects in one of the first programming language or a third programming language, further comprising:

determining, by the database interface, whether the application requesting the data object processes data objects in the first programming language or the third programming language, wherein the step of transforming the accessed data object to the transformed data object implemented in the first programming language occurs if the application requesting the data object processes data objects in the first programming language;

transforming, by the database interface, the accessed data object to the transformed data object implemented in the third programming language if the application requesting the data object processes data objects in the third programming language; and returning, by the database interface, the transformed data object in the third programming language to the application that initiated the request.

19. In an electronic device, a method for providing information on a class, comprising:

receiving, by a database interface, a definition of a class and attributes in the class of a first data object implemented in a first programming language, the database interface is in communication with a database and capable of storing the first data object implemented in the first programming language or the first data object implemented in a second programming language to the database;

generating, by the database interface, a file; and adding, by the database interface, information to the file to provide a class schema representing the class and each attribute in the class.

20. The method of claim 19, comprising providing the file to the database interface with a request to take an action on the first data object, the action associated with a second programming language; and establishing, by the database interface using the class schema from the file, a second data object implemented in the second programming language to represent the first data object.

21. The method of claim 19, further comprising: generating, by the database interface, at least one tagged element into the file to represent at least one attribute in the class.

22. The method of claim 21, wherein generating the at least one tagged element into the file for each attribute in the class further comprises for each attribute of the class:

generating one tagged element into the file including information on one of a name, a length, and a data type of the attribute.

23. The method of claim 21, wherein the generated file comprises an Extensible Markup Language (XML) file.

24. The method of claim 19, further comprising:

accessing the definition of the class, including information on attributes of the class, from a source code file of the class.

25. A system for maintaining a database of data objects, comprising:

a computer readable medium including the database of data objects;

means for receiving, by the database interface, a request to store in a database capable of storing data objects in a second programming language a first data object implemented in a first programming language including attributes and attribute values for a class, the database interface in communication with the database and capable of storing data objects implemented in the first programming language or the second programming language to the database;

means for transforming, by the database interface, the first data object to a second data object implemented in a second programming language, wherein the second data object includes the attributes and attribute values of the class included in the first data object; and means for storing, by the database interface in response to the request, the second data object to the database.

26. The system of claim 25, further comprising:

means for receiving, by the database interface, a class schema including information on the class and attributes of the first data object; and means for using, by the database interface, the received class schema to transform the first data object to the second data object.

27. The system of claim 26, wherein the means for using the received class schema to transform the first data object to the second data object further performs:

generating a source code file in the second programming language to implement the class and attributes included in the class schema;

compiling the source code file to generate an executable file that implements methods of the class;

using one method of the class to construct the second data object; and including the attribute values from the first data object into the second data object.

28. The system of claim 26, wherein the class schema includes for each attribute a name, data type and length of the attribute.

29. The system of claim 25, further comprising:

means for receiving, by the database interface, a third data object implemented in the second programming language; and means for adding, by the database interface, the third data object to the database.

30. A system for managing database requests from an application that processes data objects in a first programming language, comprising:

a computer readable medium including a database having data objects implemented in a second programming language;

means for receiving, by a database interface, a request from the application for a data object in the database storing the data object in a second programming language, the data object having attributes and attribute values of a class, the database interface in communication with the database and capable of returning from the database data objects implemented in a first programming language or the second programming language;

means for accessing, by the database interface, the requested data object from the database;

means for transforming, by the database interface, the accessed data object to a transformed data object implemented in the first programming language, wherein the transformed data object includes the attributes and attribute values of the class in each accessed data object; and means for returning, by the database interface in response to the request, the transformed data object to the application.

31. The system of claim 30, wherein the means for transforming the accessed data object to the transformed data object further performs for the requested data object:

using a GET interface in the second programming language to access the attribute values in the accessed data object; and using a SET interface in the first programming language to add each accessed attribute value from the accessed data object to the transformed data object.

32. The system of claim 30, wherein the application that processes data objects in the first programming language comprises a first application, further comprising:

means for receiving, by the database interface, a request for at least one data object in the database from a second application that processes data objects in the second programming language;

means for accessing, by the database interface, each requested data object from the database; and means for returning, by the database interface, each data object accessed from the database in response to the request from the second application to the second application.

33. The system of claim 30, further comprising:

means for providing a class schema, wherein the class schema includes information on one class and attributes of the class of the data object in the database, wherein the means for transforming the accessed data object to the transformed data object further performs, for the accessed data object, using information on the attributes in the class schema for the class of the accessed data object to transform the accessed data object to the transformed data object.

34. The system of claim 30, wherein the application requesting the data object processes data objects in one of the first programming language or a third programming language, further comprising:

means for determining, by the database interface, whether the application requesting the object processes data objects in the first programming language or the third programming language, wherein the accessed data object is transformed to the transformed data object implemented in the first programming language if the application requesting the at least one data object processes data objects in the first programming language;

means for transforming, by the database interface, the accessed data object to the transformed data object implemented in the third programming language if the application requesting the data object processes data objects in the third programming language; and means for returning, by the database interface in response to the request, the transformed data object to the application.

35. A system for providing information on a class, comprising:

a computer readable medium;

means for receiving, by a database interface, a definition of a class and attributes in the class of a first data object implemented in a first programming language, the database interface in communication with a database and capable of storing the first data object implemented in the first programming language or the first data object implemented in a second programming language to the database;

means for generating, by the database interface, a file in the computer readable medium; and means for adding, by the database interface, information to the file to provide a class schema representing the class and each attribute in the class.

36. The system of claim 35, comprising means to provide the file to the database interface with a request to take an action on the first data object, the action associated with a second programming language; and means to establish, by the database interface using the class schema from the file, a second data object implemented in the second programming language to represent the first data object.

37. An article of manufacture including code for maintaining a database of data objects, wherein the code causes operations to be performed in an electronic device comprising:

receiving, by a database interface, a request to store a first data object implemented in a first programming language in a database capable of storing data objects in a second programming language, the first data object including attributes and attribute values for a class, the database interface in communication with the database and capable of storing data objects implemented in the first programming language or the second programming language to the database;

transforming, by the database interface, the first data object to a second data object implemented in a second programming language, wherein the second data object includes the attributes and attribute values of the class included in the first data object; and storing, by the database interface in response to the request, the second data object to the database.

38. The article of manufacture of claim 37, further comprising:

receiving, by the database interface, a class schema including information on the class and attributes of the first data object; and using, by the database interface, the received class schema to transform the first data object to the second data object.

39. The article of manufacture of claim 38, wherein using the received class schema to transform the first data object to the second data object further comprises:

generating a source code file in the second programming language to implement the class and attributes included in the class schema;

compiling the source code file to generate an executable file that implements methods of the class;

using one method of the class to construct the second data object; and including the attribute values from the first data object into the second data object.

40. The article of manufacture of claim 39, wherein generating the source code file in the second programming language further comprises:

generating statements into the source code file to define SET and GET interfaces for each attribute in the class.

41. The article of manufacture of claim 40, wherein including the attribute values from the first data object into the second data object further comprises:

using at least one GET method in the first programming language to access the attribute values from the first data object; and using at least one SET method in the second programming language to set each attribute in the second data object to the corresponding accessed attribute value.

42. The article of manufacture of claim 40, wherein including the attribute values from the first data object into the second data object further comprises:

using at least one GET method in the first programming language to access the attribute values from the first data object; and generating statements into the source code file to set the attributes in the second data object to the accessed attribute values from the first data object, wherein compiling the source code file produces the second data object with the attribute values set to the attribute values accessed from the first data object.

43. The article of manufacture of claim 38, wherein the class schema includes for each attribute a name, data type and length of the attribute.

44. The article of manufacture of claim 38, wherein the class schema is implemented in an Extensible Markup Language (XML) file.

45. The article of manufacture of claim 37, wherein the database comprises an object oriented database.

46. The article of manufacture of claim 37, wherein the first programming language comprises a non-Java object oriented language and wherein the second programming language comprises the Java programming language.

47. The article of manufacture of claim 37, further comprising:

receiving, by the database interface, a third data object implemented in the second programming language; and adding, by the database interface, the third data object to the database.

48. The article of manufacture of claim 37, further comprising:

receiving, by the database interface, a request to a store a third data object implemented in a third programming language including attributes and attribute values for one class;

transforming, by the database interface, the third data object to a fourth data object implemented in the second programming language, wherein the fourth data object includes the attributes and attribute values of the class included in the third data object; and storing, by the database interface in response to the request, the fourth data object to the database.

49. An article of manufacture including code for returning data objects from a database to an application that processes data objects in a first programming language, wherein the code causes operations to be performed in an electronic device comprising:

receiving, by a database interface, a request from the application for a data object in the database storing the data object in a second programming language, the data object having attributes and attribute values of a class, the database interface in communication with the database and capable of returning from the database data objects implemented in the first programming language or the second programming language;

accessing, by the database interface, the requested data object from the database, transforming the accessed data object to a transformed data object implemented in the first programming language, wherein the transformed data object includes the attributes and attribute values of the class of the accessed data object; and returning, by the database interface in response to the request, the transformed data object to the application.

50. The article of manufacture of claim 49, wherein transforming the accessed data object to the transformed data object further comprises for the requested data object:

using a GET interface in the second programming language to access the attribute values in the accessed data object; and using a SET interface in the first programming language to add each accessed attribute value from the accessed data object to the transformed data object.

51. The article of manufacture of claim 49, wherein the application that processes data objects in the first programming language comprises a first application, further comprising:

receiving, by the database interface, a request for at least one data object in the database from a second application that processes data objects in the second programming language;

accessing, by the database interface, each requested data object from the database; and returning, by the database interface, each data object accessed from the database in response to the request from the second application to the second application.

52. The article of manufacture of claim 49, further comprising:

providing a class schema, wherein the class schema includes information on one class and attributes of the class of the data object in the database, wherein transforming the accessed data object to the transformed data object further comprises, for the accessed data object, using information on the attributes in the class schema for the class of the accessed data object to transform the accessed data object to the transformed data object.

53. The article of manufacture of claim 52, wherein the class schema includes a length of each attribute in the class, and wherein using the information on the attributes in the class schema to transform the accessed data object to the transformed data object further comprises:

accessing information on the length for each attribute in the class schema to generate the transformed data object with a size at least equal to a sum of lengths of all of the attributes in the class.

54. The article of manufacture of claim 49, wherein the application requesting the data object is capable of processing data objects in one of the first programming language or a third programming language, further comprising:

determining, by the database interface, whether the application requesting the data object processes data objects in the first programming language or the third programming language, wherein the step of transforming the accessed data object to the transformed data object implemented in the first programming language occurs if the application requesting the data object processes data objects in the first programming language;

transforming, by the database interface, the accessed data object to the transformed data object implemented in the third programming language if the application requesting the data object processes data objects in the third programming language; and returning, by the database interface, the transformed data object in the third programming language to the application that initiated the request.

55. An article of manufacture including code for providing information on a class, wherein the code causes operations to be performed in an electronic device comprising:

receiving, by a database interface, a definition of a class and attributes in the class of a first data object implemented in a first programming language, the database interface in communication with the database and capable of returning from the database data objects implemented in the first programming language or a second programming language;

generating, by the database interface, a file; and adding, by the database interface, information to the file to provide a class schema representing the class and each attribute in the class.

56. The article of manufacture of claim 55, comprising providing the file to the database interface with a request to take an action on the first data object, the action associated with a second programming language; and establishing, using the class schema from the file, a second data object implemented in the second programming language to represent the first data object.

57. The article of manufacture of claim 55, further comprising:

generating, by the database interface, at least one tagged element into the file to represent at least one attribute in the class.

58. The article of manufacture of claim 57, wherein generating the at least one tagged element into the file for each attribute in the class further comprises for each attribute of the class:

generating one tagged element into the file including information on one of a name, a length, and a data type of the attribute.

59. The article of manufacture of claim 57, wherein the generated file comprises an Extensible Markup Language (XML) file.

60. The article of manufacture of claim 55, further comprising:

accessing the definition of the class, including information on attributes of the class, from a source code file of the class.

* * * * *